United States Patent [19]

Marchman et al.

[11] Patent Number: 5,426,302
[45] Date of Patent: Jun. 20, 1995

[54] OPTICALLY GUIDED MACROSCOPIC-SCAN-RANGE/NANOMETER RESOLUTION PROBING SYSTEM

[75] Inventors: Herschel Marchman, New Providence, N.J.; Grover C. Wetsel, Richardson, Tex.

[73] Assignee: Board of Regents, University of Texas, Austin, Tex.

[21] Appl. No.: 54,457

[22] Filed: Apr. 28, 1993

[51] Int. Cl.$^6$ ............................................. H01J 37/00
[52] U.S. Cl. ................................. 250/306; 250/307
[58] Field of Search ................ 250/306, 307; 359/368, 359/652, 654; 73/105

[56] References Cited

U.S. PATENT DOCUMENTS

| | | | |
|---|---|---|---|
| 4,101,196 | 7/1978 | Imai . | |
| 4,515,444 | 5/1985 | Prescott et al. | 359/654 |
| 4,611,119 | 9/1986 | Favekas et al. | 250/307 |
| 4,837,435 | 6/1980 | Sakuhara et al. | 250/306 |
| 4,837,445 | 6/1989 | Nishioka et al. | 250/442.1 |
| 4,874,945 | 10/1989 | Ohi | 250/306 |
| 4,908,519 | 3/1990 | Park et al. | 250/306 |
| 4,914,293 | 4/1990 | Hayashi et al. | 250/306 |
| 4,945,235 | 7/1990 | Nishioka et al. | 250/306 |
| 4,962,306 | 10/1990 | Hodgson et al. | 250/310 |
| 4,999,494 | 3/1991 | Elings | 250/306 |
| 4,999,495 | 3/1991 | Miyata et al. | 250/306 |
| 5,018,865 | 5/1991 | Ferrell et al. | 356/376 |
| 5,041,783 | 8/1991 | Ohta et al. | 250/306 |
| 5,083,022 | 1/1992 | Miyamoto et al. | 250/306 |
| 5,093,719 | 3/1992 | Prescott | 358/98 |

FOREIGN PATENT DOCUMENTS

527448A2 2/1993 European Pat. Off. .
2203205 2/1989 Japan .

OTHER PUBLICATIONS

G. Binnig and D. P. E. Smith, "Single–Tube 3–Dimensional Scanner for Scanning Tunneling Microscopy", *Rev. Sci. Instrum.*, vol. 57, pp. 1688–1689 (Aug. 1986).
G. C. Wetsel, Jr., et al., "Calibration of Scanning Tunneling Microscope Transducers Using Optical Beam Deflection," *Appl. Phys. Lett.*, vol. 55, pp. 528–530 (Aug. 7, 1989).
Y. Kuk and P. J. Silverman, "Scanning, Tunneling Microscope Instrumentation," *Rev. Sci. Instrum.*, vol. 60, pp. 165–180 (Feb. 1989).
D. P. DiLella, et al., "Control Systems for Scanning Tunneling Microscope with Tube Scanners," *Rev. Sci. Instrum.*, vol. 60, pp. 997–1002 (Jun. 1989).
G. Binnig, et al., "Atomic Force Microscope," *Phys. Rev. Lett.*, vol. 56, pp. 930–933 (Mar. 3, 1986).
NanoScope TM I Scanning Tunneling Microscope Brochure (Apr., 1987).

*Primary Examiner*—Jack I. Berman
*Assistant Examiner*—James Beyer
*Attorney, Agent, or Firm*—Arnold, White & Durkee

[57] ABSTRACT

A large-nanostructure probe with optically guided macroscopic scanning is disclosed for high-resolution imaging and characterization of nanostructures. The invention contemplates the use of a course positioning system, which comprises one or more quadratic index fiber optic lenses in conjunction with an optical microscope. A magnifying probe is placed in close proximity to a sample under inspection. The fiber optic lenses of the coarse positioning system are used to noninvasively carry the image of a sample-to-probe junction to the optical microscope. The optical microscope further magnifies the image, allowing for precise positioning of the probe tip to within 1 μm of a desired feature on the sample surface. For ease of viewing, the magnified image from the microscope may be displayed on a monitor using a charge coupled device ("CCD") camera, if so desired. Also disclosed is a long-range probing system wherein the probe tip may be one of a variety of measurement or probing apparatus. For example, a particularly effective configuration of the long-range probing system is one in which the optical viewing system of the present invention serves as part of a coarse approach system for a scanning tunneling microscope probe.

13 Claims, 6 Drawing Sheets

OPTICALLY GUIDED MACROSCOPIC-SCAN-RANGE/NANOMETER RESOLUTION PROBING SYSTEM

BACKGROUND OF THE INVENTION

This invention relates to optical viewing systems. In particular, the invention relates to an optically guided long-range probing system which includes a coarse approach system and a magnifying probe.

Magnifying probes are known in the art. One type of such probe is a scanning tunneling microscope (STM), as described in Kuk and Silverman, "Scanning Tunneling Microscope Instrumentation," 60 *Rev. Sci. Instrum.* 165–180 (Feb. 1989), incorporated herein by reference. Such devices allow the surface structure of conductive materials to be observed at the atomic level. Topographical images and electrical characteristics of surface features may be obtained with lateral resolution less than 100 pm. In typical operation, the conductive probe tip of the STM is placed within approximately 1 nanometer of the conductive sample material. By applying a voltage between the conductive sample material and the conductive probe tip, the STM induces a current ("tunneling current") between the sample and the probe tip. The surface to be viewed must thus be conductive. This tunneling current is highly sensitive to extremely fine distance changes between the sample and the probe tip. By monitoring the tunneling current, the STM allows the surface structure of the sample to be observed at the atomic level.

Another type of magnifying probe is an atomic force microscope, or AFM, which is a combination of the principles of the STM and the stylus profilometer. Unlike the STM, the AFM does not require a conductive surface on the sample, and thus can be used to investigate both conductors and insulators on the atomic scale. Lateral resolutions of 30 Å and vertical resolutions of less than 1 Å are possible with the AFM. The operation and structure of ATM's are described more fully in G. Binnig and C. F. Quate, "Atomic Force Microscope," 56 *Physical Review Letters* pp 930–33 (1986), the disclosure of which is herein incorporated by reference.

One disadvantage of conventional magnifying probes is their inability to determine the location of the probe tip with respect to particular features on the sample surface. This is due in part to the limited range of view provided by a magnifying probe (typically 100 $\mu m^2$). Therefore, coarse approach systems have been designed, which enable the operator to position the probe tip of the magnifying probe at a desired location with respect to the sample. The magnifying probe itself may then be used for very fine positioning of the probe tip.

Previous attempts to create a coarse approach system for a magnifying probe have been too complex, expensive, or invasive. One known technique combines an STM with an electron microscope in a vacuum. The electron microscope serves to locate the coarse position of the probe tip with respect to the sample surface. This system, however, is undesirable because of its complexity and the cost associated with creating and maintaining the vacuum environment.

Piezoelectric-transducer scanners can be used for micrometer-scale scanning; however, for coarse positioning of the sample relative to the probe tip, other devices (which are capable of millimeter or greater scanning range) are used. The principal extant problem for measurements of a submicrometer area at a desired address in a macroscopic sample has been the initial positioning of the probe tip. That is, for characterization of relatively large nanostructures such as quantum dots, the issue is probe placement at the origin of a coordinate system to which a map of the heterostructure is referenced. Once this initial (coarse) placement is accomplished, the piezoelectric transducers can be used for fine positioning and scanning. For the characterization of relatively-large nanostructures, atomic resolution is usually not as important as optically-guided initial positioning; thus, probe-design considerations are different from those of the traditional magnifying probe.

Optical microscopes have been suggested as coarse positioning devices. However, such devices are undesirable because they add vibration to the system. Moreover, optical microscopes are limited in their degree of proximity to the tip-to-sample junction because of physical constraints.

SUMMARY OF INVENTION

The problems outlined above are addressed by the device of the present invention. The long-range probing system presented herein overcomes the prior art problems of complexity, cost, and invasiveness, yet allows positioning of a probe to within 1 $\mu m$ of a desired location with respect to a sample. The coarse or long-range (with scan ranges of as much as 25 mm) positioning of the probe tip is guided by a novel optical viewing system. Topographical characterization is accomplished using the tip of a probe (such as an STM) mounted on a piezoelectric scanner. Both coarse and fine scan systems have been integrated to form a scanned large-nanostructure probe (SLNP). The SLNP makes possible the measurement of electrical as well as topographical characteristics of individual nanoscale features or devices at a known location on a macroscopic sample.

The probing system is comprised of four basic parts: (1) a magnifying probe; (2) a unique optical viewing system for coarse positioning of the probe tip; (3) a fine positioning system; and (4) computer-controlled instrumentation.

The optical viewing system of the present invention contemplates the use of one or more quadratic index fiber optic lenses to carry the image of the probe-to-sample junction to an optical microscope. The optical microscope further magnifies the image, allowing for positioning of the probe tip to within 1 $\mu m$ of a desired location with respect to particular features on the sample surface. For ease of viewing, the magnified image from the microscope can be displayed on a monitor using, for example, a charge coupled device ("CCD") camera, if so desired. The optical viewing system of the present invention is capable of determining the coarse position of the probe tip in an air, liquid, or vacuum environment, while leaving both the probe apparatus and the sample undisturbed.

The probe tip can be comprised of any suitable measurement or probing apparatus, such as an STM. For example, a particularly effective application of the present invention is a long-range probing system in which the optical viewing system of the present invention serves as part of a coarse approach system. Although in known magnifying probes the probe tip location cannot easily be determined, use of the optical viewing system of the present invention as a coarse approach system enables determination of the probe tip location on the sample surface to within 1 $\mu m$.

With typical magnifying probes, the material surrounding the junction between the probe tip and the sample prevents placing a microscope or other optical component close enough to the probe-to-sample junction to determine the location of the probe tip with respect to particular features on the sample surface. The optical viewing system of the present invention, however, takes the tip and sample image from inside the probe system using small and noninvasive quadratic index fiber optic lenses, which translate the image outside the probe system where it can then be inspected by conventional viewing instruments. Thus, the viewing system disclosed herein, which can achieve effective magnifications up to 2000×, is capable of collecting images from areas not accessible to a conventional optical component, such as a microscope.

Because it may precisely locate a probe tip for atomic-level inspection, the unique optical viewing system of the present invention has possible applications in at least the following areas:
1) inspection of semiconductor integrated circuits and materials;
2) characterization, modification, and fabrication of nanoscale quantum devices;
3) characterization of electro-optic devices;
4) molecular level measurement of microscopic biological samples; and
5) very detailed probing and stimulation of neural networks.

Operation of the long-range viewing system of the present invention is essentially as follows. The location of the probe is found using the optical viewing system, the position of which is adjusted by translation stages devoted to the optical viewing system. After the probe location has been determined, the sample is then moved with respect to the probe using the sample translation stages. This adjustment continues until the probe tip is brought to within 1 $\mu$m of the desired point on the sample surface, as determined by the optical viewing system. The fine positioning system then allows further adjustments until the probe tip is precisely placed with respect to a desired feature on the sample surface. The long-range magnifying probe can then begin imaging the sample on the angstrom scale using known techniques. Thus, beginning with a known origin, one may position a probe tip relative to a desired location on a sample surface to within at least 1 nanometer of precision.

The present invention, therefore, provides an improved system that allows micron-feature orientation of a probe with respect to a sample, without being invasive, excessively complex, or expensive. These and other advantages of the present invention will be further appreciated from the drawings and from the detailed description provided below.

BRIEF DESCRIPTION OF DRAWINGS

The herein described advantages and features of the present invention, as well as others which will become apparent, are attained and can be understood in more detail by reference to the following description and appended drawings, which form a part of this specification.

It is to be noted, however, that the appended drawings illustrate only exemplary embodiments of the invention and are therefore not to be considered limiting of its scope, for the invention may admit to other equally effective embodiments.

DETAILED DESCRIPTION

A long-range probing system in accordance with the present invention includes a coarse positioning system, a fine positioning system, a magnifying probe, and electronic amplification and control circuitry.

Figure 1:
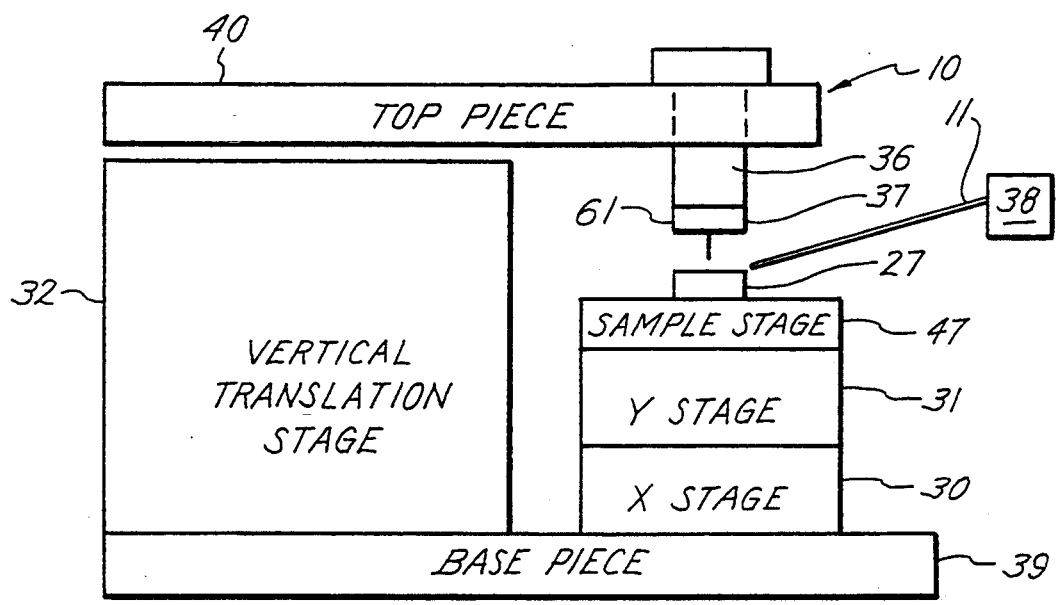
FIG. 1 is a block diagram illustrating the structure of the long-range probing system of the present invention.

An exemplary mechanical structure of the long-range probing system 10 of the present invention, illustrated in FIG. 1, consists principally of three parts. The X and Y translation stages 30 and 31, respectively, are mounted on base plate 39, and fine scanner 36 is mounted in top piece 40. These two main parts are separated from each other by vertical coarse translation stage 32, thus forming a C-shaped structure. Sample 27 is placed on top of sample stage 47, which is in turn placed on top of Y stage 31 and X stage 30. Probe tip 37 is positioned above sample 27. Coarse positioning system 38 is mounted independently of long-range probing system 10, and is shown in more detail in FIG. 3.

Figure 2:
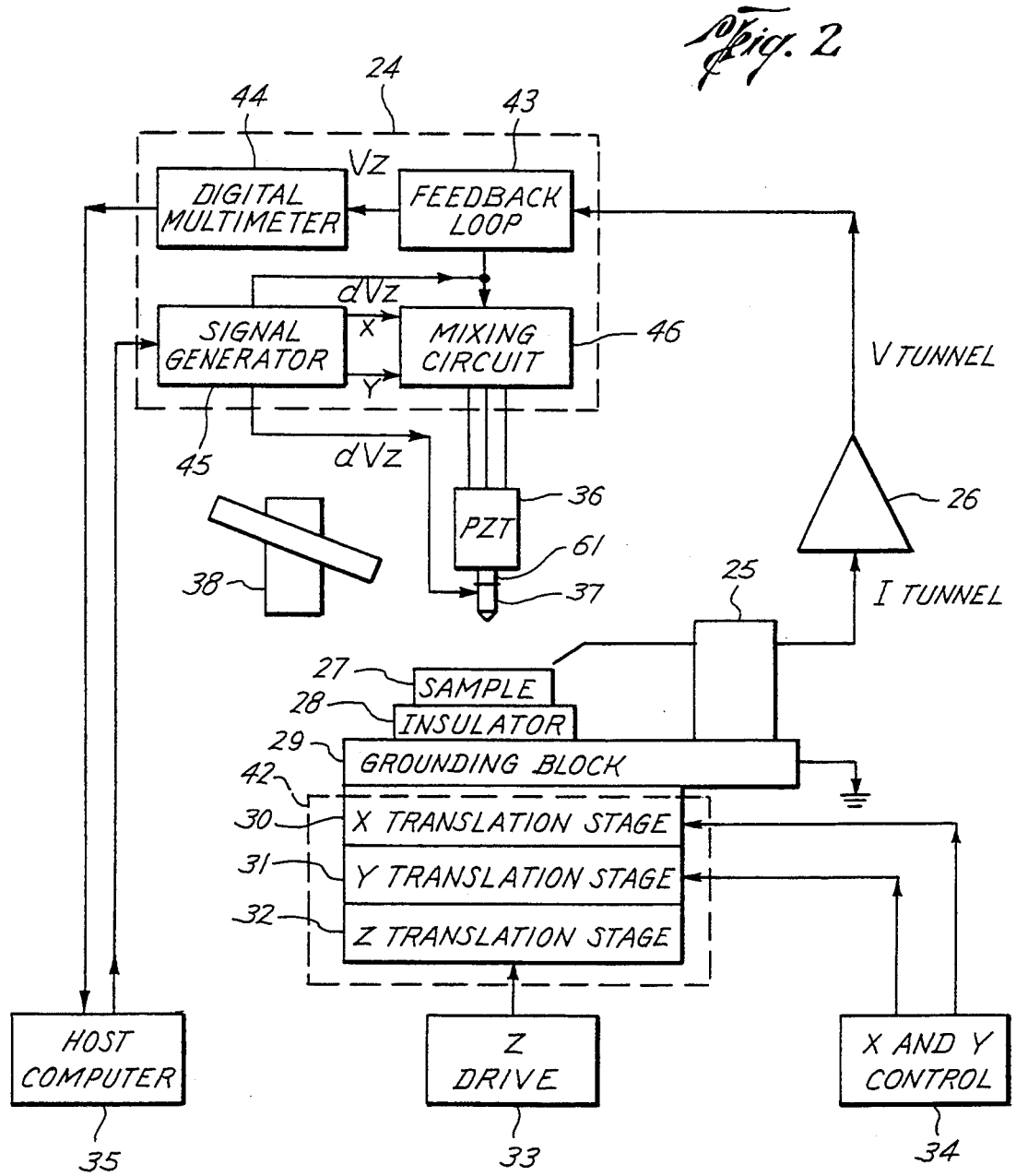
FIG. 2 is a functional block diagram illustrating a long-range probing system, including a coarse positioning system, a fine positioning system, an electronic amplification and control circuitry, and computer control instrumentation, in accordance with the present invention.

FIG. 2 is a block diagram of the long-range probing system of the present invention. Probe tip 37 is placed above sample which is separated from the rest of the system by insulating block 28 and grounding block 29. Probe tip 37 is coupled to piezoelectric scanner 36 for fine positioning, and is electrically separated from scanner 36 by insulator 61. Control circuitry includes digital multimeter 44, feedback loop 43, signal generator 45, and mixing circuit 46. Micromanipulator probe station 25 is also located on grounding block 29, and probe 37 extends to sample 27. The signal from probe station 25 travels through preamplifier 26 to control circuitry 24. Host computer 35 controls data from probe station 25 and control circuitry 24.

Translation stage 42 includes X translation stage 30, Y translation stage 36 and Z translation stage 32 for maneuvering sample 27 with respect to probe tip 37.

The actual physical layout of these translation stages is shown in FIG. 1; FIG. 2 merely represents their functional layout. X and Y translation stages 30 and 31 are driven by X and Y control 34. Z translation stage is driven by Z drive 33. Optical viewing system 38 is more fully illustrated in FIG. 3.

Table I below lists exemplary part numbers for the components of FIG. 2. It is to be understood, however, that certain of these component parts may be different for a given implementation of the present invention, and the part numbers in Table I are provided only for the purposes of describing a presently preferred implementation of the invention.

TABLE I

| Component | Exemplary Part/Model Number |
| --- | --- |
| X and Y translation stages 20 and 21 | Newport 461 Series X-Y translation stage |
| Z translation stage 22 | Newport 416 Series vertical translation stage |
| X and Y control 24 | Piezoelectric micrometer, such as Burleigh Instruments PZA-030-6 |
| Concentric tube scanner 26 | Stavely Sensors PZT-5H segmented tube |
| Micromanipulator probe 15 | Micromanipulator Co. Model 210 |
| Digital multimeter 14 | HP 3458A Multimeter |
| Signal generator 45 | HP 3852A Data Acquisition and Control Unit |
| Control computer 25 | Hewlett Packard (HP) 300 series computer |

As shown in FIG. 2, the total long-range probing system of the present invention is comprised of four basic parts: the coarse positioning system (represented by optical viewing system 38 and translation stage 42), the fine positioning system (represented by PZT 36), the electronic amplification and control circuitry (represented by preamplifier 26, control circuitry 24, probe station 25, Z-drive 33, and X and Y control 34), and the computer control instrumentation (35). FIG. 2 illustrates the exemplary case of using an STM as the magnifying probe. It will be apparent to those skilled in the art that other suitable magnifying probes may be substituted with appropriate modifications.

Coarse X-Y positioning of a probe is often provided by translation stages driven either by piezoelectric motors (such as Inchworms manufactured by Burleigh Corporation of Burleigh Park in Fishers, NY) or manual differential-screw micrometers. Although Inchworm stages can provide the computer-controlled horizontal X and Y positioning with encoded steps sizes of as small as 0.1 micrometers with overall range of 25 mm, they may introduce considerable mechanical and electrical noise to the magnifying probe. Therefore, instead of Inchworm stages, manually adjusted differential micrometer driven stages are preferred for horizontal stages 30 and 31. Such manually-driven stages can provide 0.1 micrometer resolution over a range of 25 mm with very little mechanical noise and no electrical noise. However, vertical coarse translation stage 32 may be adjusted either manually with a micrometer screw or electrically with a piezoelectric micrometer (Inchworm) driven by a continuous DC high voltage source. Using preferred components described herein, the system's overall combined electrical and mechanical noise may be as low as approximately 1 Å.

Figure 2A:
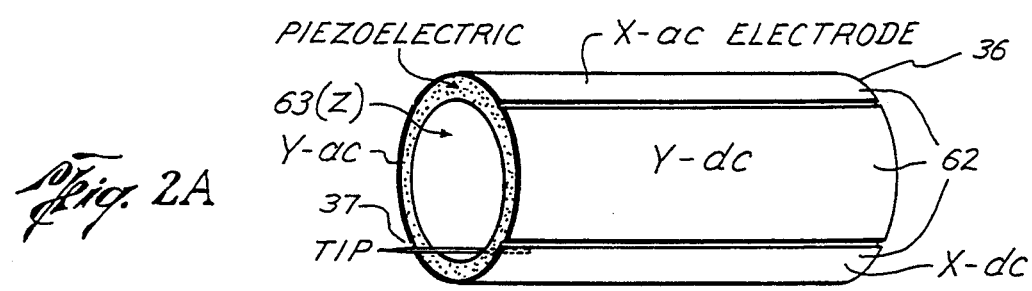
FIG. 2A shows a segmented piezoelectric tube scanner in accordance with the long-range probing system shown in FIG. 2.

A single-tube, three-dimensional piezoelectric scanner 36 is preferred for fine positioning of the probe tip as well as scanning for the angstrom resolution images. A suitable scanner is described in G. Binnig and D. P. E. Smith, "Single-tube three-dimensional scanner for scanning tunneling microscopy," 57 *Rev. Sci. Instrum.* 1688 (1986), the disclosure of which is incorporated herein by reference. A preferred tube scanner 36 is fabricated from a single piezoelectric tube, and is capable of providing calibrated sub-angstrom displacements. The transducer in this case is a transverse electric-field length expander in cylindrical geometry with the outer electrode 62 segmented into quadrants parallel to the axis. FIG. 2A illustrates tube scanner 36 showing electrode 62 sectioned into four equal areas parallel to the axis of tube 36.

The displacement of tube scanner 36, and thus probe tip 37, is determined as a function of applied voltage using the optical-beam-deflection technique described by Wetsel, et al., "Calibration of scanning tunneling microscope transducers using optical beam deflection," 55 *App. Phys. Lett.* 528 (1989), the disclosure of which is incorporated herein by reference. As voltage is applied to a single outside electrode segment (such as X-ac), that electrode segment is made to expand perpendicular to the electric field. This causes the whole tube 36 to bend perpendicular to its axis. Orthogonal X-Y motion is obtained by controlling the voltages on two of the electrodes (X-ac and Y-ac) spaced 90° apart. The other two electrodes (X-dc and Y-dc) can be grounded or used as large amplitude offsets by applying voltage to the inside electrode, Z. Voltage applied to the inside electrode 63 (Z) causes a uniform elongation of the tube. Uncertainty in tip-sample location (due to system noise) is on the order of 1 Å. This is calculated by multiplying the tube-scanning calibration factor determined with the optical-beam-deflection technique by the measured electrical noise in the fine scanner transducer voltage.

If an STM is used as a magnifying probe in a long-range probing system according to the present invention, then preferred electronic circuitry includes transimpedance preamplifier 26 for tunneling current-to-voltage conversion and feedback loop 43 for control. The tunneling current is collected from sample 27 and converted to voltage by preamplifier 26, which preferably uses a precision instrumentation amplifier that has a leakage current below 1pA. The first stage of feedback circuit 43 takes the difference between the voltage corresponding to the actual tunnel current and the set reference voltage corresponding to a desired tunnel current. In this way, the desired tip-to-sample distance is set and maintained. Next, an integration amplifier in feedback loop 43 smooths the different signals. The output from the integrator is amplified to suitable levels in order to drive the piezoelectric scanner tube 36. For horizontal X-Y scanning, a summing circuit (not shown) is added to create the proper signals for driving piezoelectric scanning tube scanner 36.

Computer 35 (such as a HP 300 series computer) may be used to control the data acquisition instrumentation and to display the electronic images. To obtain an image, sweeping signals are generated by computer control-to-signal generator 45 and applied to the quadrants of PZT tube 36 to make tip 37 scan over a desired area. For STM probes, the topographic information is obtained from the feedback voltage applied to PZT scanner 36, which is the active element of feedback loop 43, when the STM is in the constant current mode. The voltages are measured preferably using a high speed digital 6½ digit resolution multimeter 44. These voltages are translated into images by computer 35.

In some applications of the long-range probing system using an STM, a distortion or curvature of the image for large scan areas has been observed. This distortion was determined to be due to non-linearity of the PZT scanner at higher voltages, as distortion was not evident for smaller scan voltages Coarse positioning of probe tip 37 is accomplished with novel optical viewing system 38 of the present invention, which is preferably made up of an image guiding subsystem, an optical microscope, and, if desired, a CCD camera connected to a high resolution monitor. These components are mounted on various translation stages for lateral, vertical, and angular positioning. This system allows one to scan the image guide across the sample surface until probe tip 37 is found. The probe-to-sample junction view may also be used for coarse vertical approach of the tip to the sample when first establishing tunneling. The coarse approach system of the present invention is capable of moving the sample a full range of 1 inch in 10 nanometer steps in three dimensions. Moreover, its novel configuration allows it to collect images from areas not accessible to conventional optical components, such as a microscope.

The novel viewing system of the present invention can achieve magnification up to 2000×, and is thus ideal for integrated-circuit device inspection and characterization with its micrometer-scale viewing and positioning capability. At a magnification of 2000×, the horizontal X or Y position of the probe tip is known to within one micrometer relative to an established origin on the sample. At lower magnifications, views of the entire sample may be obtained. The tube scanner (PZT scanner) is used for high-resolution imaging of areas as large as 3 μm by 3 μm. Angstrom-unit-resolution imaging can be achieved for the smaller scan ranges of about 10 nm by 10 nm.

Figure 3:
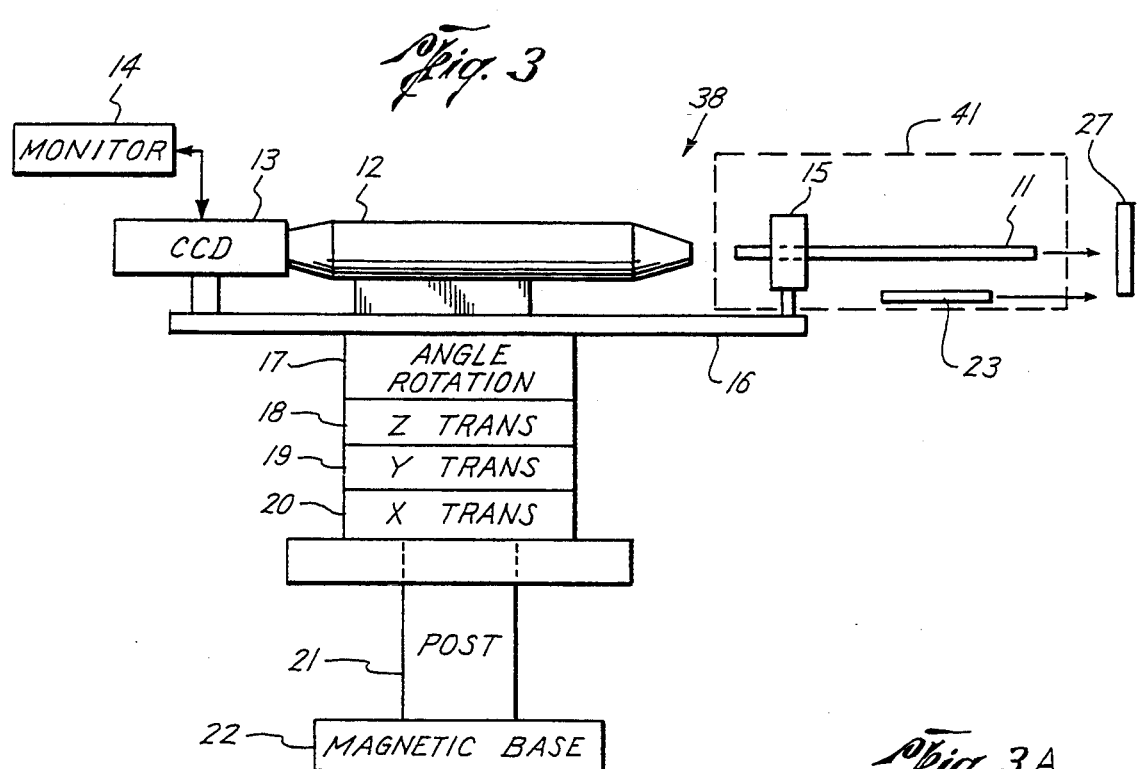
FIG. 3 shows an optical viewing system for localized observation of a sample and probe junction in accordance with the present invention.

FIG. 3 illustrates an optical viewing system 38 in accordance with the present invention. CCD camera 13, microscope 12, and optical fiber 11 are placed on base 16. Fiber positioner 5 holds optical fiber 11 in place. Fiber optic light source 23 is used to illuminate sample 27. For ease of viewing, monitor 14 is connected to CCD camera 13. Optics post 21 supports base 16. Translation stages 17, 18, 19 and 20 are set up around post 21 so that stage 17 allows angular rotation, stage 18 allows Z translation, stage 19 allows Y translation, and stage 20 allows X translation. The whole system is preferably placed on a stabilized magnetic base 22 to decrease vibration, to isolate the system, and to facilitate placement of the optical system. For stabilization, magnetic base 22 is affixed firmly to an attractive surface by magnetic force. Other methods of firmly attaching the base to a stable surface, such as mechanical affixation (i.e., screws, clamps, etc.), will be apparent to those skilled in the art. Magnetic base 22 is a preferred base because it is stable, yet may be easily moved to a new location if desired by temporarily deactivating the magnetic force.

Table II below lists exemplary parts for the components of FIG. 3. It is to be understood, however, that certain of these component parts may be different for a given implementation of the present invention, and the part numbers in Table II are provided only for the purposes of describing a presently preferred implementation of the invention.

TABLE II

| Component | Exemplary Part/Model Number |
| --- | --- |
| Optical fiber 11 | N.S.G. America self-focusing Rod Lens (SRL-0.65-5.0-2002) or other quadratic index fiber optic rod lenses |
| Microscope 12 | Melles Griot Microscope (04-TFF-002) |
| CCD camera 13 | Hitachi VK-C150 |
| Monitor 14 | Hitachi High Resolution Monitor |
| Fiber positioner 15 | Newport Model FPR2 |
| Translation stage 17 | Newport 471 Series stage |
| Translation stage 18 | Newport 416 Series stage |
| Translation stages 19 and 20 | Newport 421 Series stages |
| Optics post 21 | Newport 32A post |
| Magnetic base 22 | Newport Model 200 base |

The heart of optical viewing system 38 is image guiding subsystem 41 of the optical viewing system, shown in FIG. 3. This subsystem is composed of one or more sections of a single optical fiber with a quadratic index-of-refraction profile. A quadratic index is preferable to continually refocus the light rays from the object toward the center of the fiber, and thus prevent distortion of the image due to reflections off the inner wall of the fiber. Self-focusing (SELFOC) rod lenses are a commercially available form of quadratic index fibers that are modified for use in the long-range probing system in accordance with the present invention. Suitable SELFOC rod lenses may be obtained from N.S.G. America, Inc., 28 World's Fair Drive, Somerset, N.J. The self-focusing rod lenses ("SRLs") are typically designed as relay lenses for small diameter imaging systems, such as endoscopes.

Figure 3A:
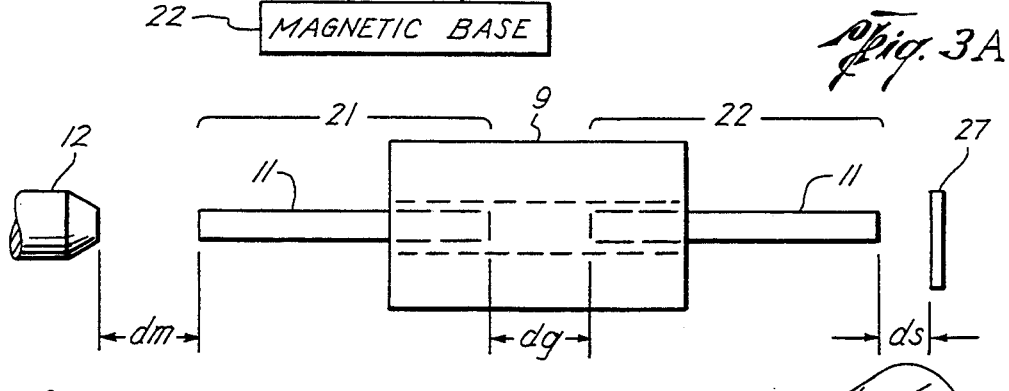
FIG. 3A shows a pair of self-focusing rod lenses connected in series for use in the optical viewing system of FIG. 3.

As illustrated in FIG. 3A, a plurality of optical fibers 11 may be connected in series using one or more alignment collars 9. In FIG. 3A, ds corresponds to $f_1$, the object distance of the first lens. In turn, dg corresponds to $f_2$, the object distance of the second lens, which is equivalent to $f_1$, the image distance of the first lens. Finally, dm corresponds to $f_2'$ the image distance of the second lens and the location of the final image.

Figure 4:
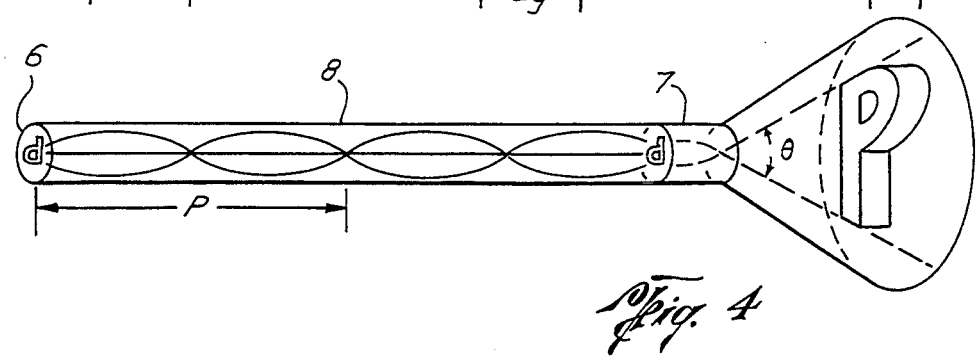
FIG. 4 is a diagram showing magnification by an unmodified self-focusing lens system.

FIG. 4 illustrates the magnification performed by an unmodified SRL 8. SRL's 8 are typically used with SELFOC imaging lens 7 to form a complete image guide. SELFOC image lens 7 is commonly used as an objective lens to gather light at a wide angle and focus it, forming a demagnified (and possibly inverted) image 6 at the back surface of SRL 8, as shown in FIG. 4. For the long-range-probe coarse guidance system of the present invention, SELFOC imaging lens 7 is removed from the SELFOC rod lens 8 so that the image guide has a new, narrower, viewing angle Θ of approximately 9°, and hence much less demagnification This is desirable since the features of interest are microscopic in this case. Of course, any suitable quadratic index fiber may be used in the optical viewing system of the present invention.

A more commonly used name for quadratic index fiber is GRadient INdex (GRIN) lens. Gradient index material refracts the light continuously yet discretely at the surface. In the case of radial gradient material, the index of refraction is greater in the center of the fiber and decreases as radial distance from the center axis increases. This index-of-refraction profile is given by:

$$N(r) = N_0 \left(1 - \frac{A}{2} r^2\right) \quad (1)$$

where $N_0$ = refractive index on axis, A = refractive index gradient constant, and r = radial distance from the optical axis. Light travels through the cylindrical GRIN lens, or quadratic fiber, in a sinusoidal fashion because light rays bend toward regions of higher refractive index. In this way, the rays of light from the image are guided, without reflecting off the fiber's inner walls, and thus preventing distortion of the image. This process is described in A. Yariv, *Optical Electronics*, Ch. 2, p. 23 (5th ed. 1985), the disclosure of which is incorporated herein by reference.

The length of the GRIN lens needed for light to execute one cycle, or sine wave, is measured by one pitch (P). The actual lens length (Z) is calculated from the pitch (P) and the index gradient constant A with the formula:

$$Z = \frac{2\pi(P)}{\sqrt{A}} \quad (2)$$

Since GRIN lenses are unmistakably thick lenses, the concept of focal length becomes slightly more complicated. It is very inconvenient to measure the location of the principal planes and, therefore, difficult to measure the actual focal length. A more practical parameter is the working distance of the lens. The object distance is the actual distance from the lens to the object to be viewed. Mathematically, the working distance is defined as:

$$l_2 = \frac{1}{N_0 \sqrt{A}} \frac{[N_0 \sqrt{A}\, l_1 \cos(\sqrt{A}\, Z) + \sin(\sqrt{A}\, Z)]}{[N_0 \sqrt{A}\, l_1 \sin(\sqrt{A}\, Z) - \cos(\sqrt{A}\, Z)]} \quad (3)$$

Figure 5:
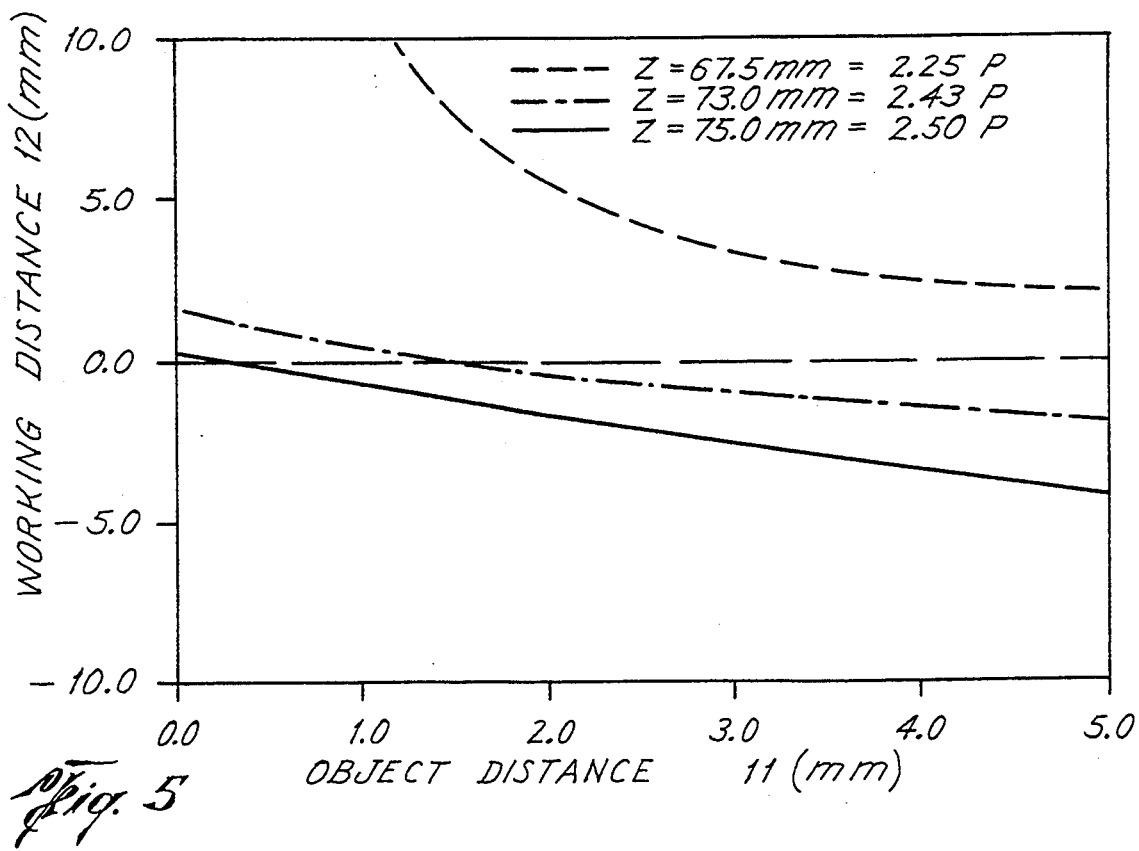
FIG. 5 is a graph of working distance plotted against object distance for the lens used in the system of FIG. 3.

If $l_2 > 0$, a real image is formed; if $l_2 < 0$, a virtual image is formed, if $l_2 = 0$, an image is formed on the end face of the SELFOC. Working distance is defined as the physical distance from the lens surface to the image focal plane, and is illustrated in the graph of FIG. 5.

Magnification is determined by the ratio of the image size to the object size. Magnification (M>1) occurs when the lens-to-image distance is greater than the object-to-lens distance. The magnification M is given by:

$$M = \sqrt{\frac{N_0^2 A L_2^2 + 1}{N_0^2 A l_1^2 + 1}} \quad (4)$$

Figure 6:
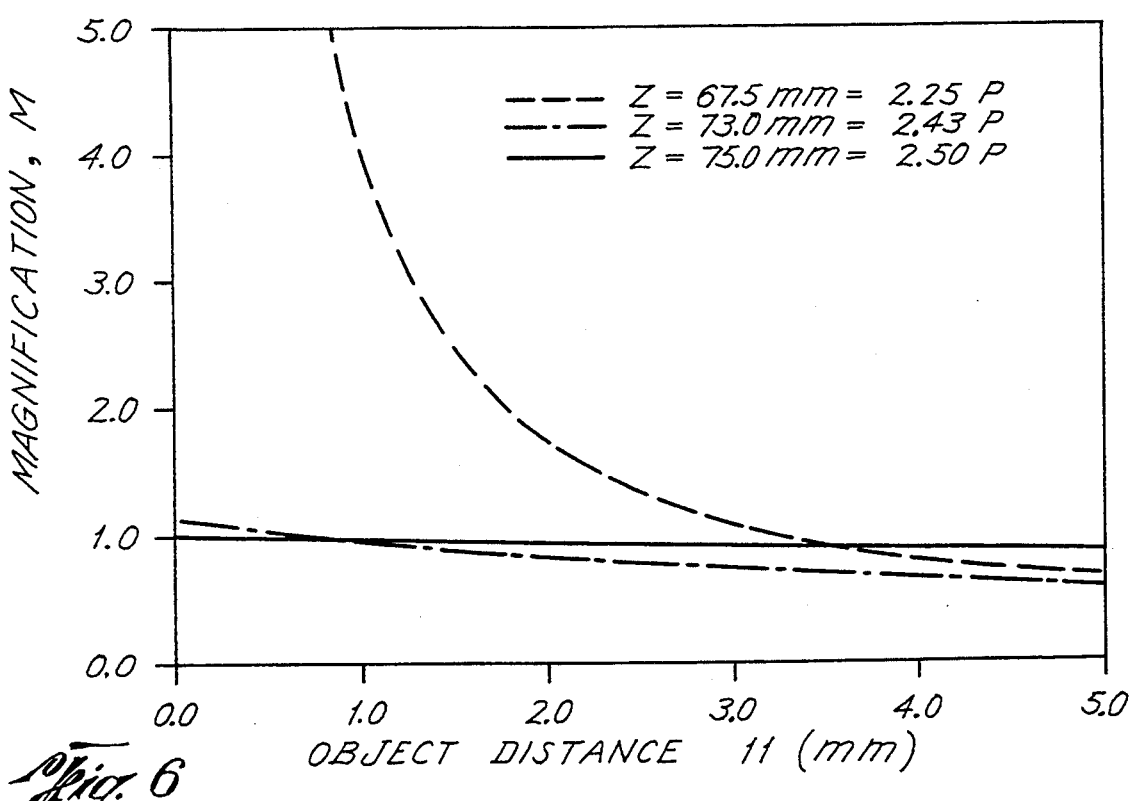
FIG. 6 is a graph of magnification plotted against object distance for the lens used in the system of FIG. 3.

The magnification can also be adjusted by cutting the SRL to specific lengths that are not integer multiples of P, as indicated in the graph of FIG. 6.

SRL's are not always an integer number of pitch. In fact, quite often they are cut to be an integer number of quarter-pitches to enhance their optical magnification and working distance. The optical characteristics of the image guide can be tailored by appropriately varying the length of the rod lens.

Because the acceptance angle of the SRL is usually quite narrow (around 9°), the light illuminating the sample must be collimated. A fiber optic light source 23 (shown in FIG. 3) is preferred because of its collimated output and adjustable direction. In addition, the small size of a fiber source allows the light to be placed very close to the sample, without disturbing the magnifying probe. The axis of the SRL forms an angle with the surface. Due to the very narrow viewing angle of the SRL, the axis of the optical-fiber illuminator 23 and the axis of the SRL must be at the same angle to the sample-surface normal. This arrangement will maximize the brightness of the image received by the SRL.

Inherent with a conventional STM's ability to image very small (angstrom scale) features is its sensitivity to mechanical vibration and thermal drift. For larger scan ranges, susceptibility to mechanical vibration increases. Therefore, vibration isolation can be a critical part of the design of the long-range STM system.

Figure 7:
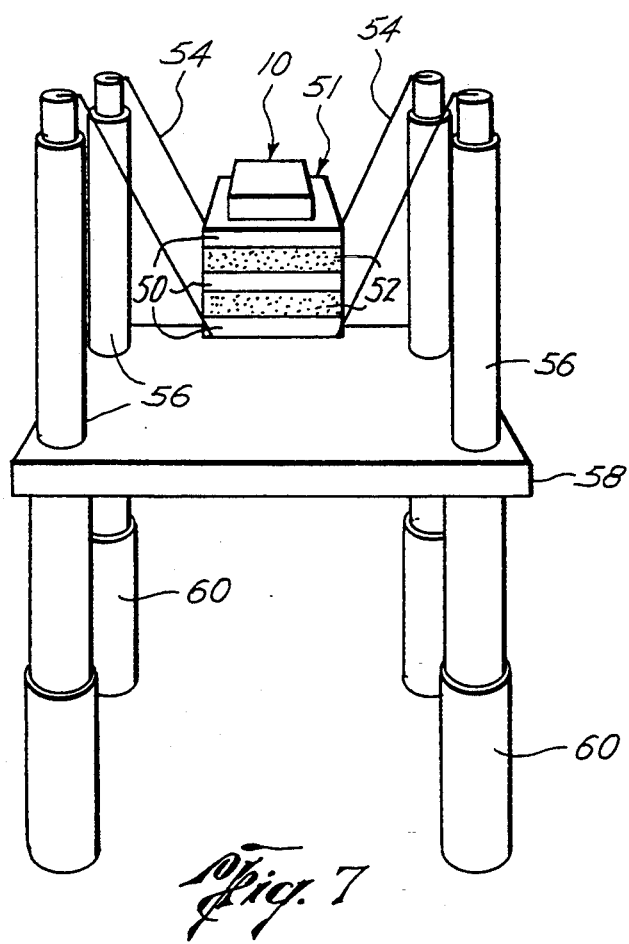
FIG. 7 illustrates a vibration damping system for use with the long-range probing system of the present invention.

As shown in FIG. 7, the long-range STM assembly of the present invention may be isolated from vibration by resting it on top of a stacked base 51 comprising a series of stacked plates 50, with neoprene rubber 52 (the substance used in vibration damping or disk drives in computers) sandwiched in between each plate 50. Long-range STM system 10 and stacked base 5 may also be suspended by flexible cords 54 (such as "bungee" cords) from four optics posts 56. Optics posts 56 contain a fluid, which also aids in vibration damping. For further isolation from vibration, optics posts 56 may be mounted on top of optics table 58 that floats on pneumatic legs

EXAMPLE OF USE

Figure 8:
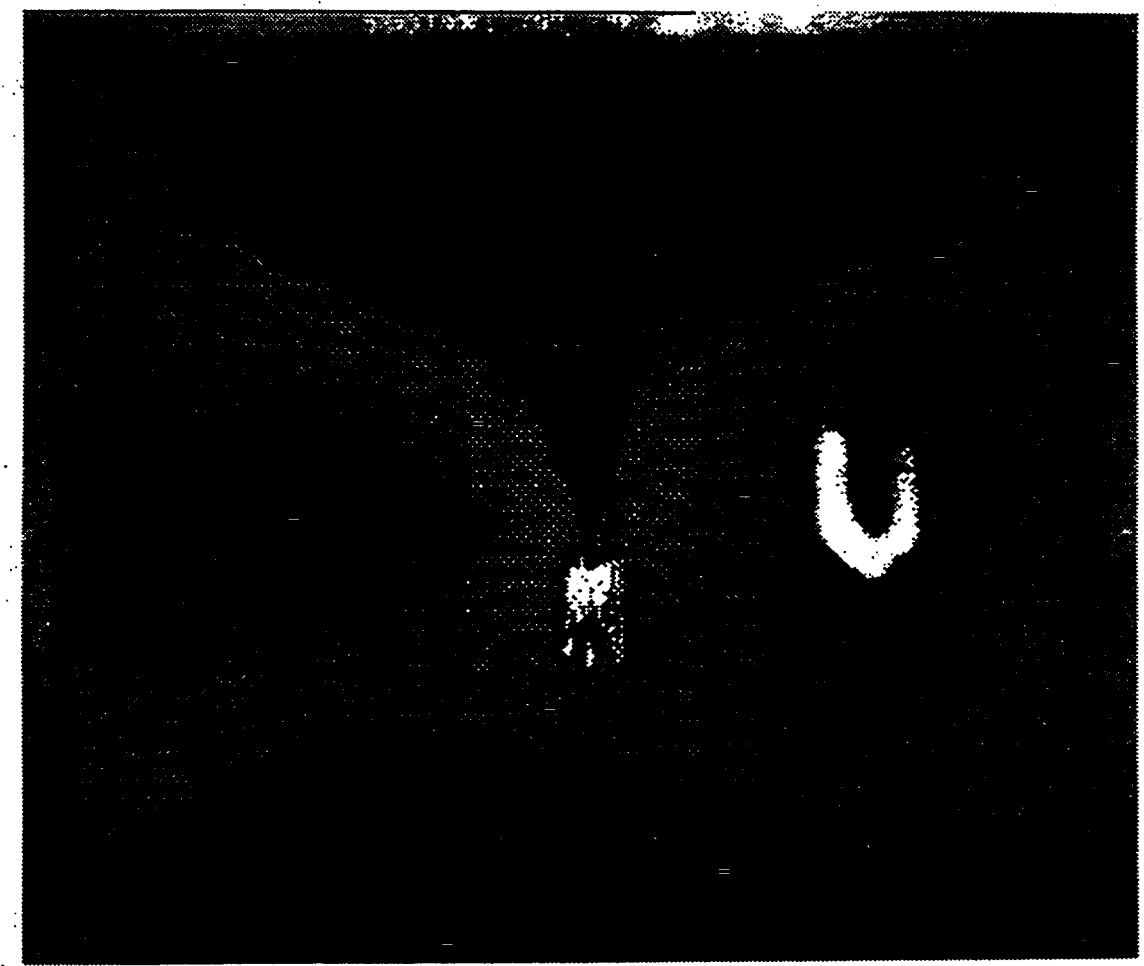
FIG. 8 is a computer-generated image of a probe tip to sample junction, as seen through an optical viewing system in accordance with the present invention.

A "flea" sample, measuring 1 mm by 0.5 mm and containing 16 quantum-dot diodes, was investigated. The top surface of the flea was passivated by an insulating nitride layer 1 $\mu$m thick, except where 10 $\mu$m by 20 $\mu$m rectangular holes, or "windows," had been etched out in order to expose a GaAs floor. One single dot was located in each window. However, the exact location of the dot within the window was unknown prior to fine scanning. The tip/sample junction, as seen through the optical viewing system, is shown in FIG. 8. The bright rectangular region appearing in the center of the picture is the GaAs window. The probe tip (STM tip) and its shadow are seen in the upper and lower halves of the image, respectively. The bright "V" is an index that indicates which quantum dot is being inspected.

Initially, the coarse positioning system was used to bring the STM tip to within 1 $\mu$m of a desired point within the GaAs window containing the quantum dot. Since the fine scanner can typically scan image areas as large as 3 $\mu$m by 3 $\mu$m, the resolution of the optical guidance system disclosed herein was quite sufficient to bring the probe tip to within fine scan range of the region of interest.

Figure 9:
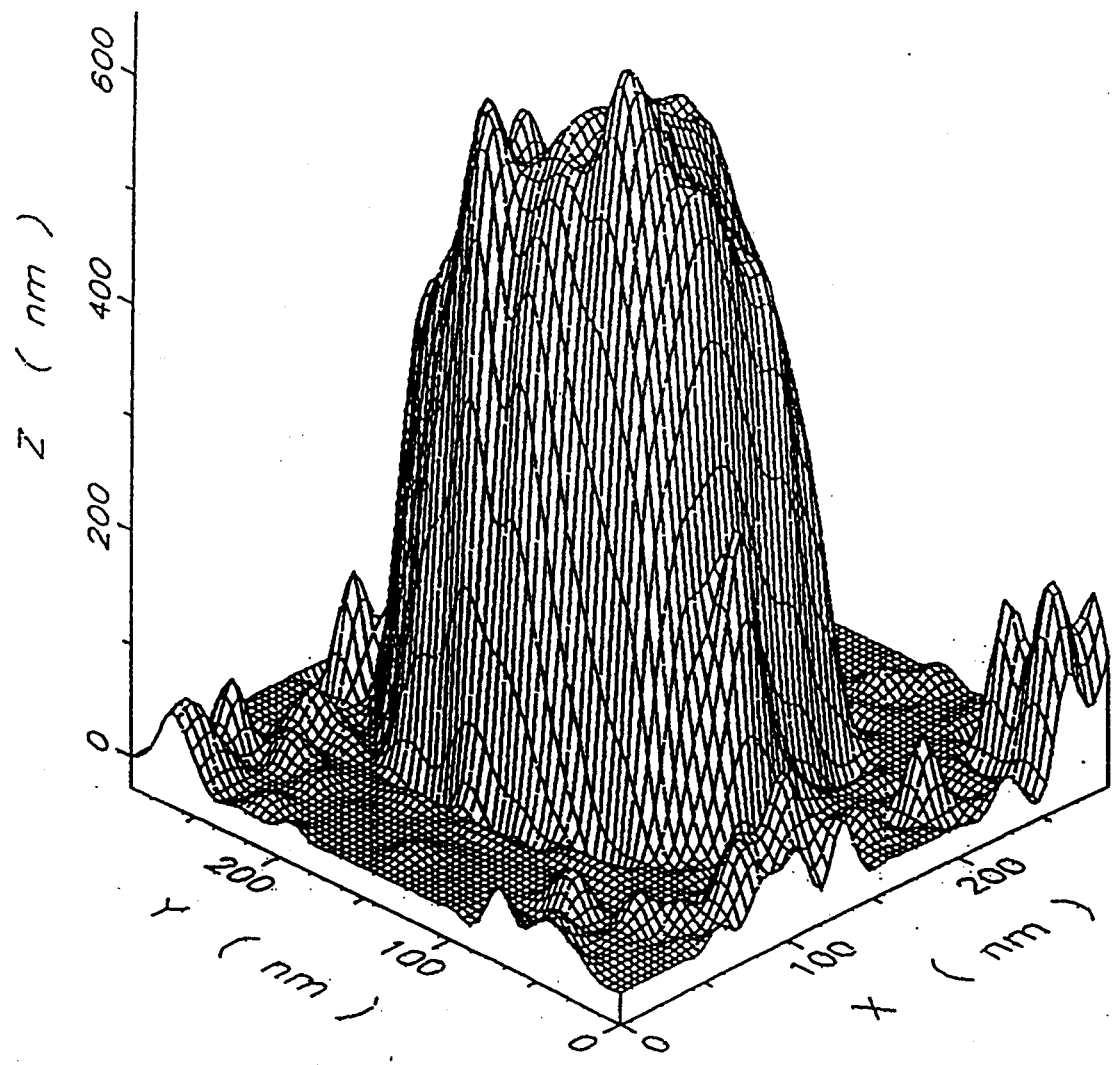
FIG. 9 is an image of a quantum dot obtained with a long-range probing system in accordance with the present invention.

Once coarse positioning was achieved, the fine scanning and high-resolution STM imaging were carried out until the quantum dot was found. Imaging of particular regions of the dot could then be performed at higher magnifications. An STM image of a single identifiable quantum dot is shown in FIG. 9. Other samples with different quantum dot arrangements have also been successfully imaged.

From the foregoing description of a specific embodiment of the present invention, it should be apparent that an optically-guided scanned large-nanostructure probing system has been disclosed. Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent electrical components or materials may be substituted for those illustrated and described herein, and certain features of the invention may be utilized independently of the use of other features, all as would be apparent to one skilled in the art after having the benefit of this description of the invention.

What is claimed is:

1. A long-range probing system for producing magnified images of a sample, comprising:
    a high magnification probe having a tip adapted to be placed proximate to the sample so as to form a tip-to-sample junction;
    a segmented piezoelectric concentric tube scanner coupled to said probe tip;
    a least one translation stage coupled to said probe tip; and
    an optical viewing system optically coupled to said tip-to-sample junction and physically separate from said high magnification probe, said optical viewing system comprising:
        at least one quadratic index optical fiber rod lens having an object end and an image viewing end; and
        an optical microscope having an object end and an image viewing end, said object end of said microscope being optically coupled to said image viewing end of said rod lens.

2. The optical system of claim 1, wherein said probe comprises a scanning-tunneling microscope.

3. The long-range microscope system of claim 1, wherein said translation stage comprises a manually adjusted differential micrometer driven stage.

4. The long-range microscope system of claim 1, further comprising:
    a vibration damping structure for supporting the system, comprising:
        a stacked base comprising a plurality of support plates;
        vibration-absorbent material located between each support plate and a next adjacent support plate;
        an optics table having a top surface and a plurality of pneumatic legs, said top surface supported by said pneumatic legs;
        a plurality of fluid-filled optics posts coupled to and extending upward from the top surface of said optics table; and
        a plurality of flexible suspension cables each having a supporting end and a fastening end, each said fastening end coupled to an optics post and each said supporting end coupled to said stacked base for suspending said stacked base above said top surface of said optics table.

5. The long-range probing system according to claim 1, wherein said optical viewing system is coupled to at least one translation stage independent of said probe-tip translation stage.

6. Apparatus for viewing magnified images of the surface of a sample, comprising:
    a high magnification probe having a probe tip adapted to be positioned proximate said surface so as to form a probe tip-to-sample junction;
    an optical microscope positioned remote and physically separate from said high magnification probe; and
    a quadratic index fiber optic lens coupled to said optical microscope and positioned to translate an image of the probe-to-surface sample junction to the optical microscope for magnification by the microscope.

7. The apparatus of claim 6, wherein said probe comprises a scanning tunneling microscope.

8. The apparatus of claim 6, wherein the lens comprises a self-focusing rod lens.

9. The apparatus of claim 8, wherein the self-focusing rod lens is a sectioned lens comprising a plurality of separate sections of the lens material in optical alignment.

10. A method of imaging a nanometer-scale feature on a sample, comprising:
    providing an optical viewing system, said optical viewing system comprising:
        at least one quadratic index optical fiber rod lens having an object end and an image viewing end; and
        an optical microscope having an object end and an image viewing end, said object end of said microscope being optically coupled to said image viewing end of said rod lens;
    providing a high magnification probe having a tip;
    positioning said high magnification probe with respect to said sample to form a tip-to-sample junction;
    positioning said optical viewing system to view said tip-to-sample junction such that said optical viewing system is optically coupled to said tip-to-sample junction and physically separate from said high magnification probe;
    positioning the sample with respect to the probe tip
    providing a fine positioner coupled to said probe tip;
    fine positioning said probe tip; and
    magnifying said sample using said high magnification probe.

11. The method of claim 10, wherein said high magnification probe is a scanning tunneling microscope.

12. The method of claim 10, wherein said fine positioner is a segmented piezoelectric tube.

13. The method of claim 10, wherein said sample positioning step comprises positioning said sample so that a feature desired to be magnified on said sample is within approximately 1 $\mu m$ of said probe tip.

* * * * *

UNITED STATES PATENT AND TRADEMARK OFFICE
CERTIFICATE OF CORRECTION

PATENT NO. : 5,426,302
DATED : June 20, 1995
INVENTOR(S) : Herschel Marchman, et al It is certified that error appears in the above-indentified patent and that said Letters Patent is hereby corrected as shown below:

Column 11, line 38, delete "optical" and insert --long-range microscope--.

Column 12, line 48, at the end of the line, insert --;--.

Signed and Sealed this

Seventeenth Day of October, 1995

BRUCE LEHMAN

*Attest:*

*Attesting Officer*      *Commissioner of Patents and Trademarks*

UNITED STATES PATENT AND TRADEMARK OFFICE
CERTIFICATE OF CORRECTION

PATENT NO. : 5,426,302
DATED : June 20, 1995
INVENTOR(S) : Herschel Marchman and Grover C. Wetsel It is certified that error appears in the above-indentified patent and that said Letters Patent is hereby corrected as shown below:

At column 12, line 17, delete the word "surface", and the space after the word.

Signed and Sealed this

Sixteenth Day of April, 1996

Attest:

BRUCE LEHMAN

*Attesting Officer*  *Commissioner of Patents and Trademarks*